United States Patent
Oizumi et al.

(10) Patent No.: US 8,564,454 B2
(45) Date of Patent: Oct. 22, 2013

(54) INFORMATION PROVIDING SYSTEM, INFORMATION CENTER, IN-VEHICLE DEVICE AND INFORMATION PROVIDING METHOD

(75) Inventors: Ken Oizumi, Tokyo (JP); Koichi Kuroda, Yokohama (JP); Yasunori Maruyama, Sagamihara (JP); Kazuhito Kato, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 140 days.

(21) Appl. No.: 13/381,756

(22) PCT Filed: May 31, 2010

(86) PCT No.: PCT/JP2010/003636
§ 371 (c)(1),
(2), (4) Date: Dec. 30, 2011

(87) PCT Pub. No.: WO2011/001595
PCT Pub. Date: Jan. 6, 2011

(65) Prior Publication Data
US 2012/0098676 A1    Apr. 26, 2012

(30) Foreign Application Priority Data
Jul. 1, 2009    (JP) .................................. 2009-156943

(51) Int. Cl.
    *G08G 1/00*    (2006.01)
(52) U.S. Cl.
    USPC .............................. 340/901; 320/109; 701/22
(58) Field of Classification Search
    USPC ............. 340/901; 320/109; 701/22, 118, 300, 701/423
    See application file for complete search history.

(56) References Cited

U.S. PATENT DOCUMENTS

| | | | |
|---|---|---|---|
| 2012/0035795 A1* | 2/2012 | Yu et al. | 701/22 |
| 2012/0109515 A1* | 5/2012 | Uyeki et al. | 701/423 |
| 2012/0123670 A1* | 5/2012 | Uyeki | 701/300 |
| 2012/0306446 A1* | 12/2012 | Suganuma et al. | 320/109 |
| 2013/0079962 A1* | 3/2013 | Ishikawa et al. | 701/22 |

FOREIGN PATENT DOCUMENTS

| | | |
|---|---|---|
| JP | 09-210702 A | 8/1997 |
| JP | 10-170293 A | 6/1998 |
| JP | 2000-102102 A | 4/2000 |
| JP | 2000-102103 A | 4/2000 |
| JP | 2003-262525 A | 9/2003 |
| JP | 2007-116799 A | 5/2007 |
| JP | 2008-249503 A | 10/2008 |

* cited by examiner

*Primary Examiner* — John A Tweel, Jr.
(74) *Attorney, Agent, or Firm* — Foley & Lardner LLP

(57) ABSTRACT

An information providing system (1) for providing a passenger with information includes an in-vehicle device (30) installed in an electric vehicle (EVn), wherein the passenger is provided with the information via the in-vehicle device (30). The in-vehicle device (30) includes a notifier (38) for notifying the passenger of a congested state of a charge station candidate (CS1). The notifying is implemented by estimating (42) of the congested state of the charge station candidate (CS1) at a time point when an own electric vehicle (EV1) reaches the charge station candidate (CS1) which is a charge station (CS) reachable with a state-of-charge (SOC) of the own electric vehicle (EV1), and the estimating (42) is implemented based on: position information and the state-of-charge (SOC) of the own electric vehicle (EV1), and position information and a state-of-charge (SOC) of another electric vehicle (EV2-EVn) which is present around the charge station candidate (CS1).

10 Claims, 5 Drawing Sheets

INFORMATION PROVIDING SYSTEM, INFORMATION CENTER, IN-VEHICLE DEVICE AND INFORMATION PROVIDING METHOD

TECHNICAL FIELD

The present invention relates to an information providing system, an information center, an in-vehicle device and an information providing method which provide, as information, congested state (congestion degree) estimated at the time for the charging of an electric vehicle (including a hybrid electric vehicle), wherein the congested state is estimated for a charge station which charges the electric vehicle.

BACKGROUND ART

With respect to a path searching of an electric vehicle, a method of searching an optimum guidance path to a destination is being devised, in view of navigation capability of the electric vehicle. According to the method disclosed in the patent literature 1, when the search distance of all the paths of in the searching goes beyond the navigatable distance calculated based on the state-of-charge (residual battery quantity), the path search is implemented in such a manner that the path from a start point via a charge station to a destination is defined as an object.

CITATION LIST

Patent Literature

[Patent Literature 1] Japanese Patent Application Laid-Open No. Heisei 10 (1998)-170293 (JP10170293)

SUMMARY OF INVENTION

Technical Problem

The method disclosed in the patent literature 1 implements the path search such that an own electric vehicle travels by way of the charge station reachable with the state-of-charge. However, this conventional technology does not take into account the movement of vehicles other than the own electric vehicle. As such, even when the own electric vehicle reaches (i.e., at the time for charging the own electric vehicle) the charge station according to the path thus searched, the charge station is, as the case may be, being used by the other electric vehicle. In this case, a waiting time is necessary until the charging of the own electric vehicle, thus failing to rapidly implement the charging.

In view of the above, it is an object of the present invention to provide, as information, a congested state of the charge station at the time when the own electric vehicle reaches the charge station.

Solution to Problem

For solving the above problem, according to an aspect of the present invention, there is provided an information providing system for providing a passenger with information, the information providing system comprising: an in-vehicle device installed in an electric vehicle, wherein the passenger is provided with the information via the in-vehicle device, the in-vehicle device including: a notifier for notifying the passenger of a congested state of a charge station candidate, wherein the notifying is implemented by estimating of the congested state of the charge station candidate at a time point when an own electric vehicle reaches the charge station candidate which is a charge station reachable with a state-of-charge of the own electric vehicle, and the estimating is implemented based on: a piece of position information and the state-of-charge of the own electric vehicle, and a piece of position information and a state-of-charge of another electric vehicle which is present around the charge station candidate.

Advantageous Effects of Invention

According to the present invention, the charge station candidate's congested state at the time for charging the own electric vehicle is estimated from the movement of the other electric vehicle, to thereby provide the electric vehicle side with the congested state as information. As such, the driver can obtain such a freedom that the drive removes, from alternatives, the charge station estimated to have a high congestion degree at the time for charging and instead selects the charge station estimated to have a low congestion degree at the time for charging. As such, the driver's waiting time at the charge station is decreased, to thereby allow the driver to implement a rapid charging.

DESCRIPTION OF EMBODIMENTS

<Structure of Information Providing System 1>

Figure 1:
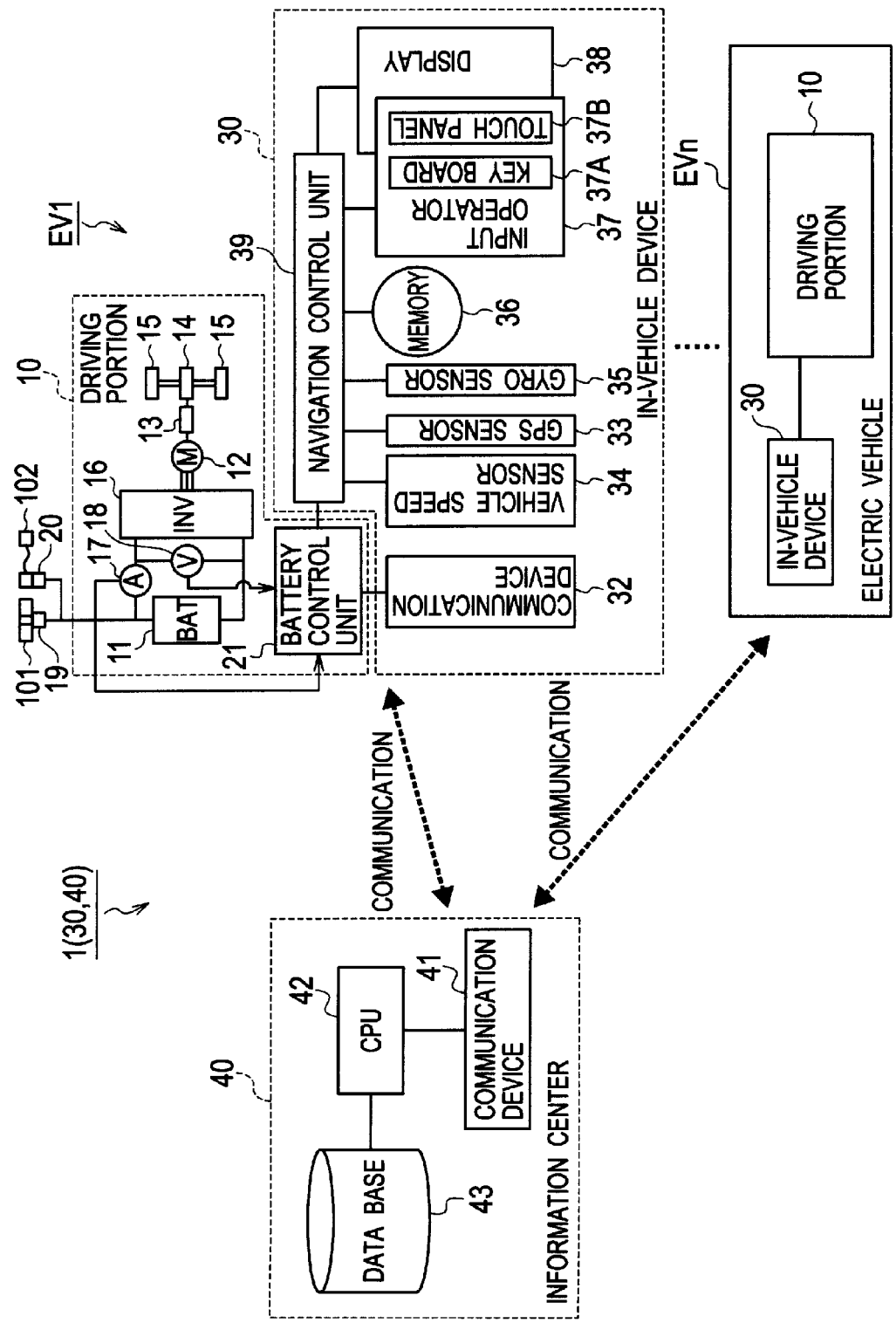
FIG. 1 is an explanatory view showing a structure of an information providing system, according to an embodiment of the present invention.

FIG. 1 is an explanatory view showing a structure of an information providing system 1, according to an embodiment of the present invention. The congested state (congestion degree) of a charge station at the time for charging an electric vehicle is estimated, thereby, the information providing system 1 provides an electric vehicle passenger of the thus estimated congested state as information. The information providing system 1 includes an in-vehicle device 30 owned by each of a plurality of electric vehicles EV1 to EVn (n: natural number) and an information center 40. Each of the in-vehicle devices 30 and the information center 40 are so structured as to make an interactive data communication. A method of the interactive data communication includes, for example, a wireless LAN (Local Area Network) commonly used for the data communication. Other than the LAN, a communication network by a communication terminal such as a cellular phone is also allowed for the interactive data communication.

At first, the explanation is to be made about a specific structure of the electric vehicle EVn. According to the embodiment, the electric vehicle EV1 is used for the explanation. The electric vehicle EV1 mainly includes a driving portion 10 for driving the vehicle and the in-vehicle device 30.

The driving portion 10 includes a battery (BAT) 11, a motor (M) 12, a decelerator 13, a drive shaft 14, a driving wheel 15, an inverter 16, a current sensor (A) 17, a voltage sensor (V) 18 and a battery control unit 21.

The battery 11 serves as a power source for supplying electric power to various electric elements installed in the electric vehicle EV1. For charging the battery 11, the battery 11 is connected to an external commercial alternating current power source 101 by way of an AC socket 19, or connected to an external special charger 102 by way of a charge socket 20. According to a mode of a charging equipment, the mode of charging the battery 11 can be arbitrarily selected. In addition, the charging method may have two systems, that is, a normal charging and a rapid charging, thus allowing the battery 11 to have specifications that meet the user request further.

The motor 12 is driven by the power of the battery 11. By way of the decelerator 13, the motor 12 is connected to the drive shaft 14 connected to the driving wheel 15. The inverter 16 is disposed between the motor 12 and the battery 11. A direct current power from the battery 11 is converted into a 3-phase alternating power by means of the inverter 16, and then is supplied to the motor 12. The inverter 16 is controlled by means of a control signal from a controller (not shown in FIG. 1), to thereby control an output torque of the motor 12.

The current sensor 17 is connected to an output line of the battery 11, to thereby sense an output current from the battery 11 and output the thus sensed data to the battery control unit 21. The voltage sensor 18 senses terminal-to-terminal voltage of the battery 11 and outputs the thus sensed voltage to the battery control unit 21.

Based on the sensed data from each of the current sensor 17 and the voltage sensor 18, the battery control unit 21 calculates a state-of-charge (SOC: residual power amount). During the period when a key switch (not shown in FIG. 1) of the electric vehicle EV1 is turned on, the battery control unit 21 continuously calculates the state-of-charge. Every time for calculating the state-of-charge, the battery control unit 21 outputs the calculation results to the in-vehicle device 30.

<Structure of In-Vehicle Device 30>

The in-vehicle device 30 implements the interactive data communication with the information center 40. In addition, the in-vehicle device 30 provides the passenger (typically a driver) with navigation information such as an own electric vehicle's position, a map around the own electric vehicle, and a path to destination. Still, the in-vehicle device 30 provides the passenger with the congestion degree associated with the charge station. The in-vehicle device 30 includes a communication device 32, a GPS (Global Positioning System) sensor 33, a vehicle speed sensor 34, a gyro sensor 35, a memory 36, an input operator 37, a display 38 and a navigation control unit 39.

The communication device 32 is a communication interface for implementing the data communication with the information center 40. Moreover, the communication device 32 serves as a transmitter for transmitting the information to the information center 40 and a receiver for receiving the information from the information center 40. The communication device 32 may be of a special wireless type that is provided for the in-vehicle device 30, otherwise, for example, a portable terminal device (provided with data communication function) such as a cellular phone.

The GPS sensor 33 receives a signal (GPS data) transmitted from a GPS satellite, and then outputs the GPS data to the navigation control unit 39. The vehicle speed sensor 34 senses the vehicle speed information of the electric vehicle EV1. The gyro sensor 35 senses a forward direction information of the electric vehicle EV1. The data sensed by the vehicle speed sensor 34 and gyro sensor 35 are outputted to the navigation control unit 39.

The memory 36 stores navigation data necessary for navigation, specifically the navigation data include various kinds of application software implemented by the in-vehicle device 30, map data of a to-be-displayed map, road data used for map matching, route guidance and the like, icon data displayed on the map, and the like. As the memory 36, for example, an optical disk as a detachable memory medium, or an HD (Hard Disk) set fixedly may be used. In addition, various kinds of removable media and the like incorporating a semiconductor memory such as flash memory may also be used.

The input operator 37 is used by the user when the user inputs a command to the in-vehicle device 30, changes setting of the in-vehicle device 30, inputs the destination which requires a path guidance, or selects a desired path from a plurality of paths displayed and proposed on the display 38. The input operator 37 may be any of a key board 37A, a touch panel 37B which is used in combination with the display 38, a mouse (not shown in FIG. 1), and a pointing device (not shown in FIG. 1). Moreover, the input operator 37 may be a remote controller for remotely controlling the in-vehicle device 30.

The display 38 is a liquid crystal display and the like and is disposed, for example, in an instrument panel of the vehicle. Through a provision image displayed on the display 38, the driver can recognize various kinds of information such as the navigation information.

The navigation control unit 39 has a function of making an overall control of the in-vehicle device 30, and implements the application software stored in the memory 36, to thereby implement various processes. As the navigation control unit 39, a microcomputer mainly including CPU, ROM, RAM and I/O interface can be used.

The navigation control unit 39 implements a position measurement by a GPS navigation (satellite navigation) based on the inputted GPS data, to thereby obtain an absolute position (latitude and longitude) information. In addition, based on the vehicle speed information from the vehicle speed sensor 34 or on the forward direction information from the gyro sensor 35, the navigation control unit 39 obtains the vehicle's relative position information by an autonomic navigation method. From the absolute position (latitude and longitude) information and from the relative position information obtained by the autonomic navigation method, the navigation control unit 39 calculates the present position of the electric vehicle incorporating the in-vehicle device 30. Based on the present position information, the navigation control unit 39 reads out, from the memory 36, various data (such as map data and road data which correspond to the present position) necessary for the navigation.

Moreover, the navigation control unit 39 uses the destination (inputted from the input operator 37) and the present position information, to thereby search for a travel path from the present position to the destination, thus implementing a guidance (route guidance) of the thus searched travel path. In this case, according to the destination inputted from the input operator 37, the navigation control unit 39 calculates the travel path that is so efficient as to bring about a minimum power consumption.

Moreover, the navigation control unit 39 generates a display image to be displayed on the display 38. For example, based on the map data and road data which correspond to the present position read out from the memory 36, the navigation control unit 39 generates the own electric vehicle's surrounding map as a display image which is to be displayed on the display 38. Moreover, in the case that the searched travel path is present, the navigation control unit 39 generates a display image made by superposing the travel path on the map, to thereby display the thus generated display image on the display 38.

As a feature of the embodiment, the navigation control unit 39 can request the information center 40 for an information provision associated with the congestion degree of the charge station. To the information center 40 by way of the communication device 32, the navigation control unit 39 (of each electric vehicle) capable of making the communication with the information center 40 transmits the position information showing the present position of the own electric vehicle and the state-of-charge showing the present remaining power amount of the battery 11 of the own electric vehicle. The above information transmission is made on the premise of implementing the information provision request. The above information transmission may be implemented periodically by the navigation control unit 39 per se or may be implemented in response to the request received from the information center 40.

When implementing the information provision request, the navigation control unit 39 refers to the navigation data stored in the memory 36. Then, based on the position information and state-of-charge of the own electric vehicle, the navigation control unit 39 searches, as a charge station candidate, for a charge station reachable by the own electric vehicle. Then, together with the information provision request, the navigation control unit 39 transmits 1) a list of the charge station candidate (hereinafter referred to as "charge station candidate list") and ii) the position information and state-of-charge of the own electric vehicle, by way of the communication device 32 to the information center 40. Then, from the information center 40 by way of the communication device 32, the navigation control unit 39 receives a certain information (congestion information) as a response to the information provision request. In this case, based on the congestion information, the navigation control unit 39 displays, on the display 38, the congestion degree in the charge station candidate.

Herein, when implementing the information provision request, the navigation control unit 39 is allowed to transmit the position information and state-of-charge of the own electric vehicle, without the need of developing the charge station candidate list by itself. In this case, the charge station candidate list is to be developed by the information center 40 according to the information provision request from the navigation control unit 39.

<Structure of Information Center 40>

Then, the structure of the information center 40 is to be set forth. The information center 40 includes a communication device 41, a CPU (Central Processing Unit) 42 and a data base 43.

The communication device 41 is a communication interface for making a data communication with each of the electric vehicles EVn, serving as a transmitter for transmitting the information to the in-vehicle device 30 and as a receiver for the receiving information from the in-vehicle device 30.

The CPU 42 has a function of making an overall control of the information center 40. According to the embodiment, the CPU 42 receives the information provision request from a certain vehicle EVn. In this case, based on the position information and state-of-charge which are associated with the electric vehicle EVn and based on the charge station candidate list, the CPU 42 (estimator) estimates the congestion degree of the charge station candidate at the time point when the electric vehicle EVn reaches the charge station candidate. Such estimation is implemented for each of the target station candidates. In this case, based on another electric vehicle's information retained in the data base 43, the CPU 42 estimates the congestion degree in view of the other electric vehicle's movement. Then, by way of the communication device 41 to the electric vehicle EVn which implemented the information provision request, the CPU 42 (transmitter) transmits the congestion information denoting the congestion degree estimated for each of the charge station candidates.

Herein, the CPU 42 receives the information provision request from the electric vehicle EVn but, as the case may be, the charge station candidate as information added to the information provision request is not present. In this case, based on the position information and state-of-charge of the electric vehicle EVn, the CPU 42 searches for a certain charge station (charge station candidate) reachable by the electric vehicle EVn. Then, based on the search result, the CPU 42 develops the charge station candidate list, to thereafter implement a series of the processes as set forth above.

The data base 43 stores various kinds of application software to be implemented by the information center 40 and the map data used for searching for the charge station. Moreover, for each of the electric vehicles EVn capable of communicating with the information center 40, the data base 43 stores information (hereinafter referred to as "electric vehicle information") associated with the electric vehicle EVn, specifically, the information including the position information and state-of-charge. Upon the request of the CPU 42 or after the CPU 42 receiving the position information and state-of-charge which are transmitted periodically from each of the electric vehicles EVn, the electric vehicle information retained by the data base 43 is renewed by the CPU 42. Moreover, as the case may be, no response is made from the electric vehicle EVn after the request has been transmitted or the position information and state-of-charge are not transmitted from the electric vehicle EVn for a certain period. In this case, the CPU 42 determines that the electric vehicle EVn is not in a traveling state presently, thereby renewing such state as the electric vehicle information.

<Flowchart of Information Providing Method>

Figure 2:
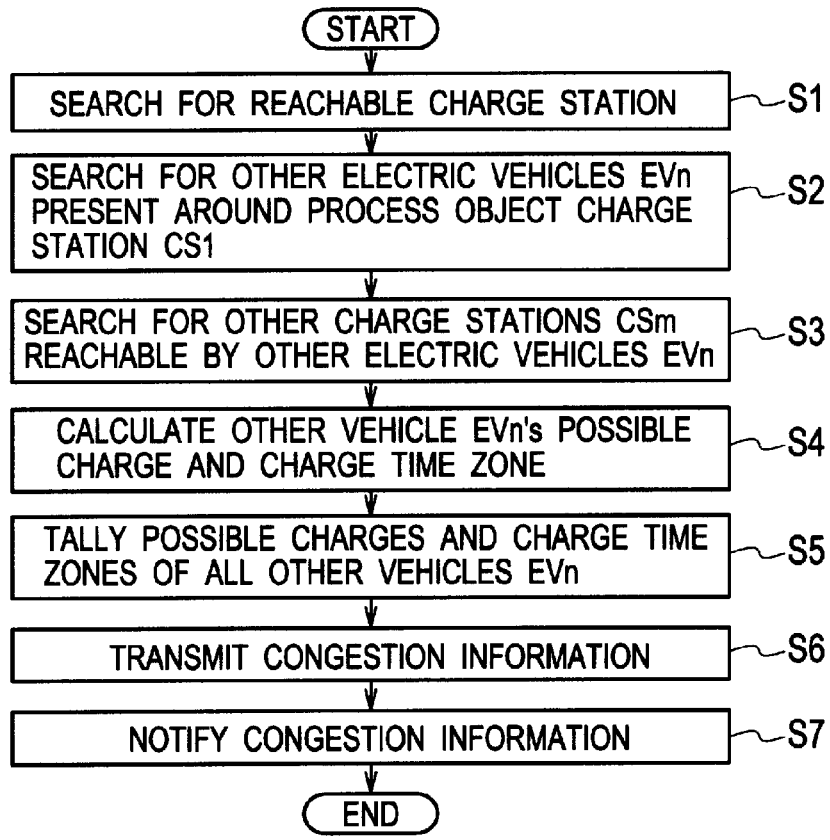
FIG. 2 is a flowchart showing process procedures of an information providing method, according to the embodiment of the present invention.

FIG. 2 is a flowchart showing process procedures of the information providing method, according to the embodiment of the present invention. Hereinafter set forth is the information providing method including the congestion degree estimating process. The charge station is to be referred to as a charge station CSm (m: natural number starting from 1). In addition, at a former part of step S1 in the flowchart, the information center 40 has certified that the in-vehicle device 30 is a pre-registered user who (which) is allowed to use the service of the information providing system 1. Moreover, of the electric vehicles EV1 to EVn, the electric vehicle EV1 is cited as an object electric vehicle for providing the information. The description is to be made based on the processes implemented between the object electric vehicle EV1 and the information center 40.

<Step 1>

At step S1, the in-vehicle device 30 (specifically, the navigation control unit 39) of the electric vehicle EV1 searches for the charge station candidate. The searching for the charge station candidate is implemented in such a case that the user designates, via the input operator 37, the charge station as destination or en route or that the distance to the destination is greater than a travelable distance with the present state-of-charge (residual battery quantity).

Figure 3:
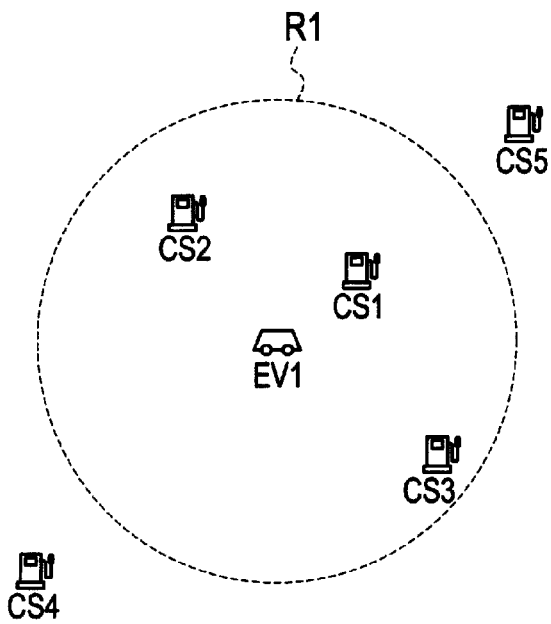
FIG. 3 is an explanatory view showing a searching concept of a charge station reachable by an electric vehicle.

Specifically, as shown in FIG. 3, based on the position information and state-of-charge, the navigation control unit 39 calculates a reachable range R1. The reachable range R1 is calculated, for example, in the following manner. Around the present position of the own electric vehicle (electric vehicle EV1), a distance navigatable with the state-of-charge is defined as a radius of a certain circle, and the reachable range R1 is calculated with the certain circle's circumference as an upper limit. Then, referring to the navigation data, the navigation control unit 39 searches for the charge station CSm present in the reachable range R1, to thereby obtain the charge station candidate. In the example shown in FIG. 3, of the charge stations CS1 to CS5, the charge stations CS1, CS2 and CS3 present in the reachable range R1 are searched as the charge station candidates, while the charge stations CS4 and CS5 present outside the reachable range R1 are not searched as the charge station candidates.

Then, based on the search results, the navigation control unit 39 develops the charge station candidate list. Then, by way of the communication device 32 to the information center 40, the navigation control unit 39 transmits the charge station candidate list and the position information and state-of-charge, together with the information provision request.

By way of the communication device 41, the CPU 42 of the information center 40 receives the information provision request from the electric vehicle EV1. Then, with each of the charge station candidates (listed in the charge station candidate list) as a process object, the CPU 42 implements the processes from the subsequent step S2 to step S5. Hereinafter, for convenience sake, the charge station candidate as the process object is to be defined as the charge station CS1. The following processes are each to be implemented for each of the charge station candidates cited in the charge station candidate list.

Herein, at step S1, the information provision request is developed after the electric vehicle EV develops the charge station candidate list. Otherwise, the information provision request may be developed in such a manner that the CPU 42 of the information center 40 receiving the information provision request searches for the data base 43 based on the position information and state-of-charge which are transmitted from the electric vehicle EV1.

<Step 2>

Figure 4:
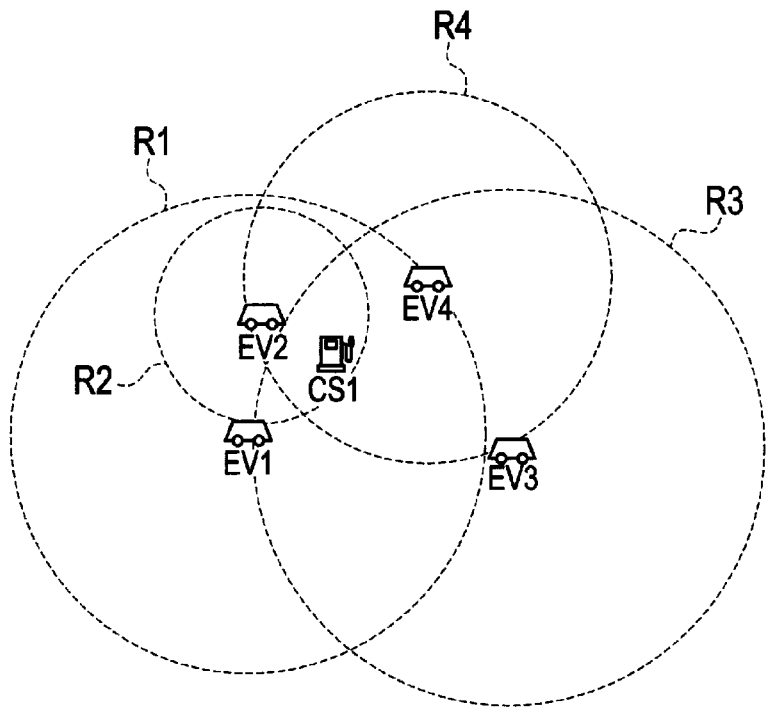
FIG. 4 is an explanatory view showing a searching concept of an electric vehicle capable of reaching the charge station.

At step S2, the CPU 42 refers to the electric vehicle information and map data which are stored in the data base 43, to thereby search for the other electric vehicle EVn present around the process object charge station CS1. For example, as shown in FIG. 4, the electric vehicles EV2 to EV 4 are searched as other electric vehicles present around the charge station CS1.

<Step 3>

At step S3, the CPU 42 refers to the electric vehicle information and map data which are stored in the data base 43, to thereby search for the charge station CSm which is reachable by the other electric vehicles with their state-of-charge. The above search is implemented for each of the other electric vehicles searched at step S2. Specifically, the CPU 42 defines, as the process object, each of the other electric vehicles searched at step S2, to thereby calculate the reachable range from the position information and state-of-charge of each of the above other electric vehicles. As such, the CPU 42 searches for the charge stations CSm included in the reachable range. Each of the thus searched charge stations CSm is listed per one of the respective other electric vehicles.

Figure 5:
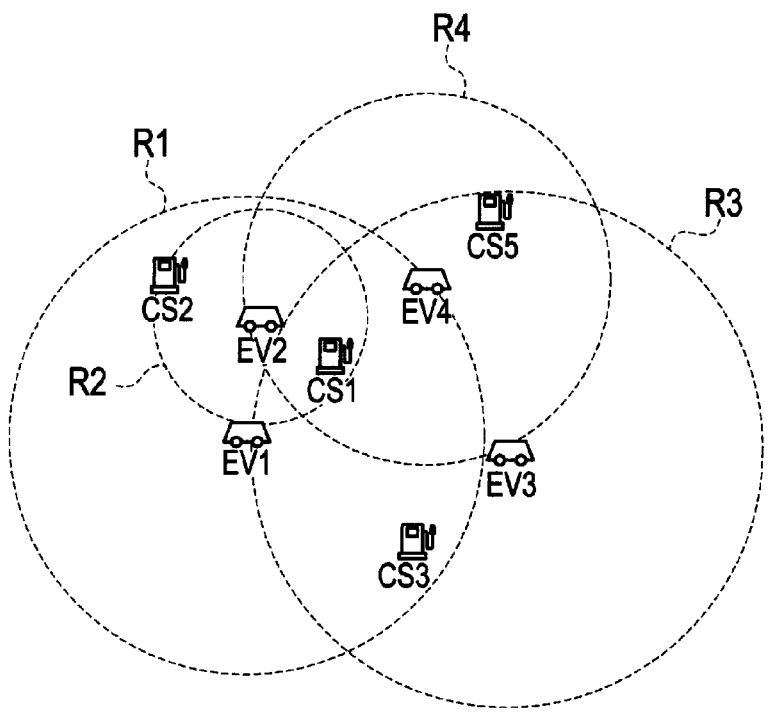
FIG. 5 is an explanatory view showing a searching concept of a charge station reachable by the electric vehicle.

For example, as shown in FIG. 5, since the charge stations CS1 and CS2 are present in the reachable range R2 of the electric vehicle EV2 as the other electric vehicle, the charge stations CS1 and CS2 are to be described in a list (hereinafter referred to as "reachable list") of the electric vehicle EV2. Moreover, since the charge stations CS1, CS3 and CS5 are present in the reachable range R3 of the electric vehicle EV3 as the other electric vehicle, the charge stations CS1, CS3 and CS5 are to be described in the reachable list of the electric vehicle EV3. Moreover, since the charge stations CS1 and CS5 are present in the reachable range R4 of the electric vehicle EV4 as the other electric vehicle, the charge stations CS1 and CS5 are to be described in the reachable list of the electric vehicle EV4.

Herein, of the other electric vehicles searched for at step S2, the CPU 42 extracts the other electric vehicle which includes the process object charge station CS1 in the reachable list. Then, with the thus extracted other electric vehicle as the process object, the routine moves to the subsequent steps.

<Step 4>

At step S4, referring to the electric vehicle information and map data which are stored in the data base 43 and referring to the reachable list associated with the other electric vehicle, the CPU 42 calculates the possible charge and charge time zone with respect to the charge station CS1 as the process object. The above calculation is implemented for each of the extracted other electric vehicles.

At first, as the premise of calculating the possible charge and charge time zone, the CPU 42 estimates a possibility that the other electric vehicle makes a stop (hereinafter referred to as "stop possibility") at the charge station CS1 as the process object. For example, the CPU 42 calculates the stop possibility as an inverse number of the number of charge stations CSm described in the reachable list. More specifically, as shown in FIG. 5, in the case of the electric vehicle EV2 as the other electric vehicle, the charge stations CS1 and CS2 (two in number) are described in the rechargeable list. Therefore, the electric vehicle EV2's stop possibility (stop at charge station CS1) is estimated to be 50% (=½), which is an inverse number of 2.

Moreover, the stop possibility may be estimated, for example, by using the other electric vehicle's forward direction or the other electric vehicle's already-traveled path. For example, there is a case that the charge station CS1 is disposed backward relative to the forward direction or disposed on the path which was passed by the other electric vehicle so far. In this case, the value calculated by the above method is defined as a standard, and the standard is to be so corrected as to lower the stop possibility.

Figure 6:
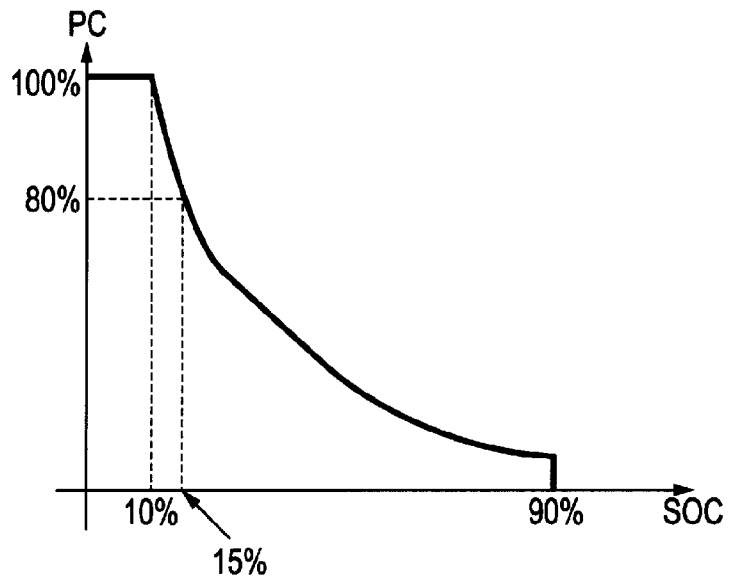
FIG. 6 shows an example of a relation between state-of-charge and possible charge.

Then, the CPU 42 of the information center 40 estimates the possible charge (initial value) of the other electric vehicle to implement charging at the charge station CS1. Several methods are conceivable for estimating the possible charge. According to the embodiment, a relation between the state-of-charge (SOC) of the other electric vehicle and the possible charge (PC) of the other electric vehicle is used, as shown in FIG. 6. The more the state-of-charge is (i.e., closer to full charge), the lower the CPU 42 estimates the possible charge. Meanwhile, the less the state-of-charge is, the higher the CPU 42 estimates the possible charge. For example, as shown in FIG. 6, when the state-of-charge (SOC) of the other electric vehicle is 15%, the CPU 42 estimates that the possible charge is 80%.

Figure 7:
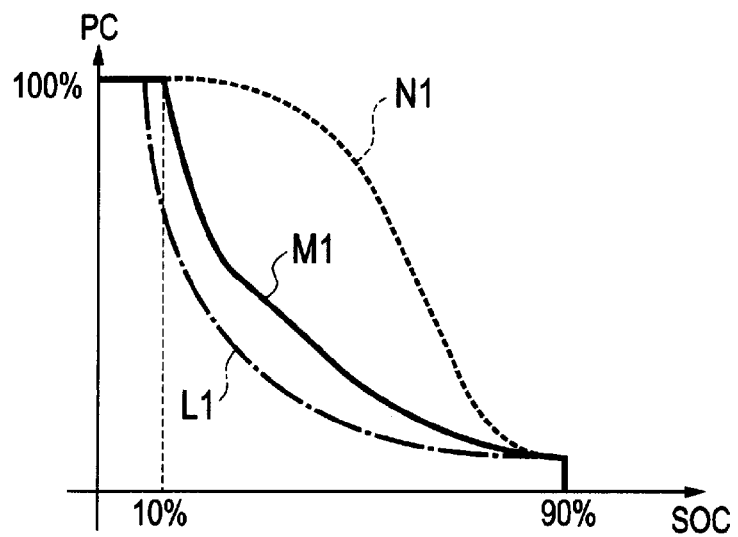
FIG. 7 is an explanatory view showing a method of correcting the relation between the state-of-charge and the possible charge.

In addition, as the relation shown in FIG. 6, a typical relation common to all the electric vehicles EVn is allowed, or an individual relation determined from a past utility condition of each of the electric vehicles is allowed. For example, as shown in FIG. 7, the relation between the state-of-charge (SOC) of the other electric vehicle and the possible charge (PC) of the other electric vehicle may be varied according to users. Such users include a standard user M1 (for example, a user who implements the charging when the state-of-charge is as low as 10%), a user N1 who implements the charging earlier than the standard user M1, and a user L1 who implements the charging later than the user M1.

Moreover, when the other electric vehicle is present close to the home of the other electric vehicle's user, as the case may be, the other electric vehicle's user does not use the charge station CSm outside. In this case, according to the distance (nearness) between the other electric vehicle and a charge venue (including the charge station) such as home or company for daily use, the possible charge at the charge station CS1 may be corrected to be smaller. Moreover, when the other electric vehicle sets a travel path for navigation and sets a specific charge station CSm (as en route or destination) other than the charge station CS1 or when use of the specific charge station is booked in advance, a correction may be made such that the possible charge at the charge station CS1 is minimized. Moreover, when the state-of-charge is rapidly decreased, a correction may be made such that the possible charge at the charge station CS1 is increased.

Herein, for implementing the above corrections, it is preferable to share necessary information between the in-vehicle device 30 and the information center 40.

Then, the CPU 42 estimates the time zone (charge time zone) of the other electric vehicle to implement the charging at the charge station CS1. This charge time zone is specified by an estimated start time of the charge time zone and an estimated end time of the charge time zone. The estimated start time is a time for the other electric vehicle to reach the charge station CS1, and is calculated based on the distance from the other electric vehicle's present position to the charge station CS1 and based on an average vehicle travel speed.

On the other hand, the estimated end time is calculated in the following manner: The charging of the other electric vehicle is started from the other electric vehicle's state-of-charge obtained when the other electric vehicle reaches the charge station CS1. Then, the charging of the other electric vehicle is ended at the estimated end time.

Then, based on the stop possibility and possible charge (initial value), the CPU 42 calculates the final possible charge. For example, in view of the electric vehicle EV2 shown in FIG. 5, when the stop possibility to stop at the charge station CS1 is 50% and the possible charge (initial value) is 80%, the final possible charge is calculated to be 40% (50%×80%). Likewise, in view of the electric vehicle EV3 shown in FIG. 5, when the stop possibility to stop at the charge station CS1 is 33% and the possible charge (initial value) is 90%, the final possible charge is calculated to be about 30% (33%×90%). Moreover, in view of the electric vehicle EV4 shown in FIG. 5, when the stop possibility to stop at the charge station CS1 is 33% and the possible charge is 90%, the final possible charge is calculated to be about 30% (33%×90%).

<Step 5>

Figure 8:
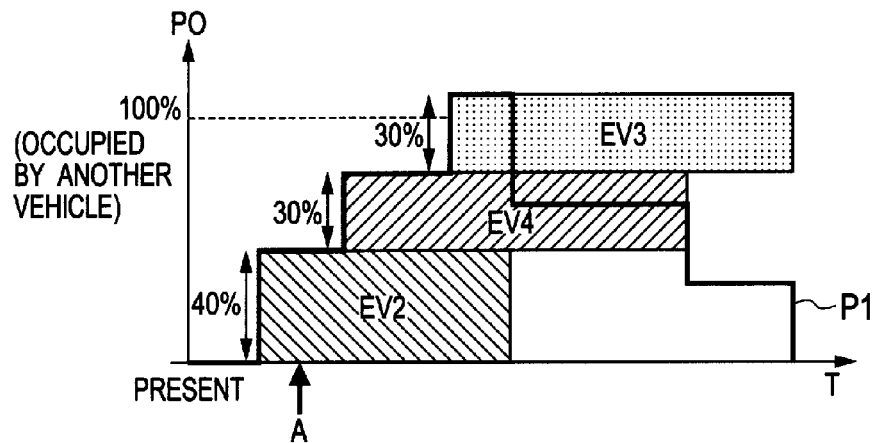
FIG. 8 shows an example of a relation between a charge station occupied rate and time.

At step S5, the CPU 42 totalizes all the other electric vehicles' possible charges and charge time zones calculated with respect to the charge station CS1. Specifically, as shown in FIG. 8, based on the other electric vehicles' possible charges and charge time zones, the CPU 42 adds up the possible charges along with time flow. With this, as depicted by an actual line P1, at which time zone and with what probability the charge station CS1 as the process object is used by the other electric vehicles EV2, EV3, EV4 can be estimated. Then, taking into account the time for the electric vehicle EV1 to reach the charge station CS1, the CPU 42 estimates, as a congestion degree, i) a possibility that the charge station CS1 is occupied (occupation possibility) by the other electric vehicles and ii) a waiting time for the charging. For example, the occupation possibility is calculated by adding up the possible charges of the other electric vehicles at the time when the electric vehicle EV1 reaches the charge station CS1. Moreover, the waiting time can be calculated based on the charge time zone of the other electric vehicles in the charging at the time for the own electric vehicle EV1 to reach the charge station CS1. Specifically, the waiting time is calculated based on the estimated end time of the other electric vehicle(s).

<Step 6>

At step S6, by way of the communication device 41 to the electric vehicle EV1 which implemented the information provision request, the CPU 42 transmits the congestion information showing the congestion degree estimated for each of the charge station candidates.

<Step 7>

Figure 9:
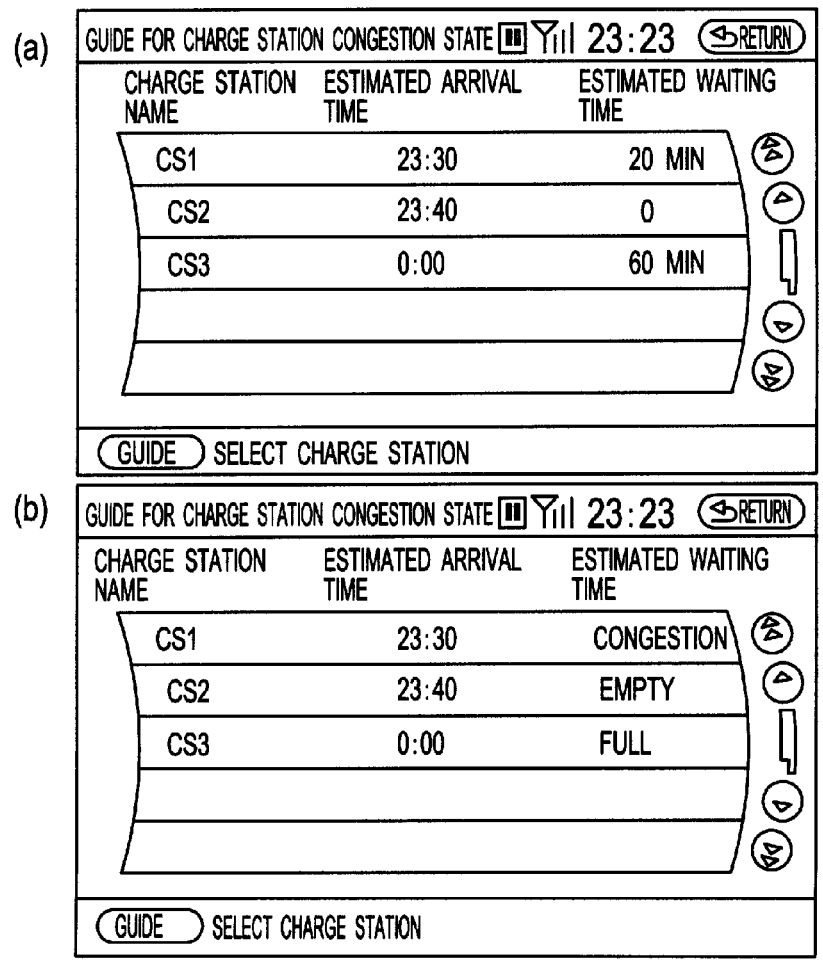
FIG. 9 shows an example of displaying, on a display of an in-vehicle device, the waiting time and congestion degree at each charge station.

At the subsequent step S7, the in-vehicle device 30 (specifically, the navigation control unit 39) of the electric vehicle EV1 receives the congestion information by way of the communication device 32. Then, at the display 38, the in-vehicle device 30 displays the congestion information of each of the charge station candidates based on the congestion information. For example, as shown in FIG. 9(a), the communication device 32 displays an estimated arrival time (time to reach each of the charge stations) in combination with the waiting time, to thereby notify the user of the congestion information. Moreover, as shown in FIG. 9(b), according to the occupation possibility to occupy the charge station candidate at the time for reaching each of the charge station candidates, the communication device 32 displays "vacant" in the case of 0% to 30%, "congested" in the case of 31% to 70% and "full" in the case of 71% or more. The above displays are made in combination with the estimated arrival time (time to reach each of the charge stations). As such, the display 38 can notify the user of the congestion information.

As such, with the information providing system 1 according to the embodiment, the in-vehicle device 30 installed in the electric vehicle EVn has the notifier such as the display 38 which notifies the passenger of the congestion degree (congested state) of the charge station candidate at the time when the own electric vehicle reaches the charge station candidate which is a charge station reachable by the own electric vehicle's state-of-charge. In this case, based on the position information and state-of-charge of the other electric vehicle present around the charge station candidates, the in-vehicle device 30 estimates the congestion degree of the charge station candidates, to thereby implement the above notification.

With the above structure, the congestion degree of the charge station candidate at the time for charging the own electric vehicle is estimated from the movement of the other electric vehicles, to thereby provide the electric vehicle side with the thus estimated congestion degree as information. As such, the driver can obtain such a freedom that the driver removes, from alternatives, the charge station candidate estimated to have a high congestion degree at the time for charging and instead selects the charge station estimated to have a low congestion degree at the time for charging. As such, the driver's waiting time at the charge station candidate is decreased, to thereby allow the drive to implement a rapid charging.

Moreover, according to the embodiment, the congestion degree is estimated based on the other electric vehicle's stop possibility, possible charge and charge time zone. With such a structure, the movement of the other electric vehicle is sufficiently reflected to the estimation of the congestion degree of the charge station candidate.

Moreover, according to the embodiment, the estimation value of the possible charge of the other electric vehicle can be corrected according to the state-of-charge obtained when the other electric vehicle implemented the charging in the past. With this, the probability that the other electric vehicle implements the charging can be accurately estimated with respect to the charge station candidate, to thereby improve the estimation accuracy of the congestion degree of the charge station.

Moreover, according to the embodiment, the estimation value of the possible charge of the other electric vehicle can be corrected to be smaller in the case that the charge station which the other electric vehicle daily uses is present around the charge station candidate. With this, the probability that the other electric vehicle implements the charging can be accurately estimated with respect to the charge station candidate, to thereby improve the estimation accuracy of the congestion degree of the charge station.

Moreover, according to the embodiment, the estimation value of the possible charge of the other electric vehicle can be corrected to be minimum in the case that the charge station other than the charge station candidate is set as the charge station at which the other electric vehicle stops. With this, the probability that the other electric vehicle implements the charging can be accurately estimated with respect to the charge station candidate, to thereby improve the estimation accuracy of the congestion degree of the charge station.

Moreover, according to the embodiment, the estimation value of the possible charge of the other electric vehicle can be corrected to be larger in the case that the state-of-charge of the other electric vehicle is rapidly decreased. With this, the probability that the other electric vehicle implements the charging can be accurately estimated with respect to the charge station candidate, to thereby improve the estimation accuracy of the congestion degree of the charge station.

The above embodiment is an example of the present invention. As such, the present invention is not limited to the above embodiment, and therefore, other than the above embodiment, the present invention may be varied according to design and the like within a range not beyond the scope of the technical concept of the present invention. Although the state-of-charge (remaining battery quantity) is used as the calculation parameter according to the above embodiment, the navigatable distance may be used for the calculation parameter. Moreover, the notification of the path guidance or congestion information which notification implemented by the navigation control unit 39 is implemented through the display 38. However, the notification may be implemented by outputting voices by way of a speaker (not shown) provided in the in-vehicle device 30. Moreover, each of the in-vehicle device (installed in the electric vehicle) and the information center functions as a part of the present invention.

Industrial Applicability

According to the present invention, the charge station candidate's congested state at the time for charging the own electric vehicle is estimated from the movement of the other electric vehicle, to thereby provide the electric vehicle side with the congested state as information. As such, the driver can obtain such a freedom that the drive removes, from alternatives, the charge station estimated to have a high congestion degree at the time for charging and instead selects the charge station estimated to have a low congestion degree at the time for charging. As such, the driver's waiting time at the charge station is decreased, to thereby allow the driver to implement a rapid charging.

This application is based on a prior Japanese Patent Application No. P2009-156943 (filed on Jul. 1, 2009 in Japan). The entire contents of the Japanese Patent Application No. P2009-156943 from which priority is claimed are incorporated herein by reference, in order to take some protection against translation errors or omitted portions.

The scope of the present invention is defined with reference to the following claims.

The invention claimed is:

1. An information providing system for providing a passenger with information, the information providing system comprising:
   an in-vehicle device installed in an electric vehicle, wherein the passenger is provided with the information via the in-vehicle device, the in-vehicle device including:
      a notifier for notifying the passenger of a congested state of a charge station candidate,
   wherein
   the notifying is implemented by estimating of the congested state of the charge station candidate at a time point when an own electric vehicle reaches the charge station candidate which is a charge station reachable with a state-of-charge of the own electric vehicle, and
   the estimating is implemented based on:
      a piece of position information and the state-of-charge of the own electric vehicle, and
      a piece of position information and a state-of-charge of another electric vehicle which is present around the charge station candidate.

2. The information providing system according to claim 1 wherein
   the congested state of the charge station candidate is estimated by the following operations:
      based on the position information and state-of-charge of each of the other electric vehicles which are present around the charge station candidate, estimating the following:
         a stop possibility that the other electric vehicle stops at the charge station candidate,
         a possible charge of the other electric vehicle to implement a charging at the charge station candidate, and
         a charge time zone for the charging by the other electric vehicle; and
      totalizing an estimation result obtained from each of the other electric vehicles.

3. The information providing system according to claim 2 wherein
   an estimation value of the stop possibility of the other electric vehicle is calculated based on the number of charge stations reachable by the other electric vehicle with the state-of-charge of the other electric vehicle,
   an estimation value of the possible charge of the other electric vehicle is calculated based on the state-of-charge of the other electric vehicle, and
   the charge time zone is calculated based on the following:
      as an estimated start time, defining a time for the other electric vehicle to reach the charge station candidate, and as an estimated end time, defining a time at which the other electric vehicle ends the charging after starting the charging with the state-of-charge thereof obtained when the other electric vehicle reaches the charge station candidate.

4. The information providing system according to claim 2 wherein
the estimation value of the possible charge is corrected according to the state-of-charge obtained when the other electric vehicle implemented the charging in the past.

5. The information providing system according to claim 3 wherein
the estimation value of the possible charge of the other electric vehicle is corrected to be smaller in a case that a charge venue which the other electric vehicle daily uses is present around the charge station candidate.

6. The information providing system according to claim 3 wherein
the estimation value of the possible charge of the other electric vehicle is corrected to be minimum in a case that the charge station other than the charge station candidate is set as the charge station at which the other electric vehicle stops.

7. The information providing system according to claim 3 wherein
the estimation value of the possible charge of the other electric vehicle is corrected to be larger in a case that the state-of-charge of the other electric vehicle is rapidly decreased.

8. An information center so configured to interactively communicate with an electric vehicle as to provide the electric vehicle with information, the information center comprising:
a receiver for receiving a piece of position information and a state-of-charge of the electric vehicle which are transmitted from each of the electric vehicles capable of communicating with the receiver;
an estimator for estimating a congested state of a charge station candidate at a time point when an object electric vehicle reaches the charge station candidate which is a charge station defined as a process object and reachable by the object electric vehicle as an object of providing the information, wherein the estimating is implemented based on a piece of position information and a state-of-charge of another electric vehicle which is present around the charge station candidate; and
a transmitter for transmitting, to the object electric vehicle, congestion information showing the thus estimated congested state of the charge station target.

9. An in-vehicle device of an electric vehicle capable of interactively communicating with an information center for providing information, the in-vehicle device comprising:
a transmitter for transmitting, to the information center, a piece of position information of an own electric vehicle and a state-of-charge of the own electric vehicle;
a receiver for receiving, from the information center, congestion information showing a congested state of a charge station candidate at a time point when the own electric vehicle reaches the charge station candidate which is a charge station reachable with the state-of-charge of the own electric vehicle, wherein the congested state is estimated based on a piece of position information and a state-of-charge of another electric vehicle which is present around the charge station candidate; and
a notifier for notifying a passenger of the congested state of the charge station candidate based on the congestion information received by the receiver.

10. A method of providing information to a passenger of an electric vehicle, the method comprising:
estimating a congested state of a charge station candidate at a time point when an own electric vehicle reaches the charge station candidate which is a charge station reachable with a state-of-charge of the own electric vehicle, wherein the estimating is implemented based on:
a piece of position information and the state-of-charge of the own electric vehicle, and
a piece of position information and a state-of-charge of another electric vehicle which is present around the charge station candidate; and
notifying, thereby, the passenger of a result of the estimating.

* * * * *